United States Patent
Ghannam et al.

(10) Patent No.: US 10,272,812 B2
(45) Date of Patent: Apr. 30, 2019

(54) CUP HOLDER

(71) Applicant: FORD GLOBAL TECHNOLOGIES, LLC, Dearborn, MI (US)

(72) Inventors: Mahmoud Yousef Ghannam, Canton, MI (US); Swadad A. Carremm, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/363,760

(22) Filed: Nov. 29, 2016

(65) Prior Publication Data

US 2018/0147968 A1    May 31, 2018

(51) Int. Cl.
  *B60N 3/10*    (2006.01)
  *A47G 23/02*    (2006.01)

(52) U.S. Cl.
  CPC ......... *B60N 3/102* (2013.01); *A47G 23/0216* (2013.01); *Y10S 224/926* (2013.01)

(58) Field of Classification Search
  CPC ...... B60N 3/102; B60N 3/10; A47G 23/0216; A47G 23/02; Y10S 224/926
  USPC ......... 248/311.2, 315, 230.1, 309.1; 224/926
  See application file for complete search history.

(56) References Cited

U.S. PATENT DOCUMENTS

| | | | | |
|---|---|---|---|---|
| 1,453,547 A * | 5/1923 | Culver | ................... | B65G 65/24 248/136 |
| 1,609,207 A * | 11/1926 | Schlabaugh | .............. | B67C 9/00 248/136 |
| 2,926,879 A * | 3/1960 | Dietrich | ............. | A47G 23/0225 224/406 |
| 4,434,961 A * | 3/1984 | Hoye | ....................... | B60N 3/10 108/44 |
| 5,141,194 A * | 8/1992 | Burgess | ................. | B60N 3/102 248/150 |
| 5,280,870 A | 1/1994 | Chick et al. | | |
| 5,342,099 A * | 8/1994 | Bahner | ................. | F16L 37/133 285/319 |
| 5,505,417 A | 4/1996 | Plocher | | |
| 5,622,346 A | 4/1997 | Story, Jr. | | |
| 6,045,017 A * | 4/2000 | Connell | ..................... | A45F 5/02 224/148.4 |
| 6,863,200 B2 | 3/2005 | Beglau | | |
| 8,066,148 B2 | 11/2011 | Garahan | | |
| 8,590,524 B2 * | 11/2013 | Ducate, Jr. | .......... | A47J 37/0786 126/25 R |
| 9,266,456 B2 | 2/2016 | Zhang et al. | | |
| 9,295,320 B1 * | 3/2016 | McManus | ............... | A45F 5/021 |

* cited by examiner

*Primary Examiner* — Tan Le
(74) *Attorney, Agent, or Firm* — Vichit Chea; King & Schickli, PLLC

(57) ABSTRACT

A cup holder includes a support, a first arm connected by a first pivot to the support and a second arm connected by a second pivot to the support. The cup holder further includes a first link connected by a third pivot to the first arm and by a fourth pivot to the second arm and a second link connected by a fifth pivot to the first arm and a sixth pivot to the second arm whereby the first arm and second arm are displaceable between a stowed position and a deployed position to hold a cup.

6 Claims, 10 Drawing Sheets

CUP HOLDER

TECHNICAL FIELD

This document relates generally to the motor vehicle equipment field and, more particularly, to a cup holder for a motor vehicle that provides additional packaging flexibility in a simple, collapsible and easy to use design.

BACKGROUND

Cup holder design is critical to the interior design of a motor vehicle. For example, cup holder packaging sometimes restricts the architecture of the console and the vehicle's interior. Unfortunately, the positioning of a cup holder within a motor vehicle is restricted due to current cup holder design and integrations. Accordingly, there is a need to develop cup holders that can provide more flexibility in positioning and thereby minimize the interior design restrictions. Such a cup holder would also have uses outside the motor vehicle environment.

This document relates to a new and improved cup holder that overcomes some of the drawbacks of state-of-the-art cup holders. Advantageously the new and improved cup holder is stylish and provides luxury car prestige. Further, the new cup holder is foldable thereby providing additional flexibility to the interior design, allowing, for example, integration into the interior trim panels of the motor vehicle including the doors and the center area. Further, the cup holder requires less material than current cup holder cavity or well designs. In some embodiments, the cup holder may actually be collapsed or stowed in the relief of a trim panel thereby appearing as embedded art.

SUMMARY

In accordance with the purposes and benefits described herein, a cup holder is provided. That cup holder comprises a support, a first arm connected by a first pivot to the support and a second arm connected by a second pivot to the support. The cup holder further includes a first link connected by a third pivot to the first arm and by a fourth pivot to the second arm. As a result, the first arm and the second arm are displaceable between a stowed position and a deployed position to hold the cup.

The cup holder may further include a second link connected by a fifth pivot to the first arm and a sixth pivot to the second arm. In addition the first link may be parallel to the second link.

The first arm may include a first end and a second end and the first pivot may be between the first end and the second end. Similarly, the second arm may include a third end and a fourth end and the second pivot may be between the third end and the fourth end.

Still further, the third pivot may be adjacent the first end and the fourth pivot may be adjacent the third end. The fifth pivot may be adjacent the second end and the sixth pivot may be adjacent the fourth end.

In addition the first arm and the second arm may be curved. Further, a cup support may depend from the second arm. That cup support may include a first slide element displaceable along a first section of the second arm so as to extend beyond the fourth pivot. Further, the cup support may include a second slide element displaceable along a second section of the second arm so as to extend beyond the sixth pivot.

Still further, the first section of the cup holder may include a first guide track and the first slide element may include a first guide track follower. Similarly, the second section may include a second guide track and the second slide element may include a second guide track follower.

Still further, the first arm may include a third section and a fourth section. The first arm may also include a first extension element displaceable along the third section and a second extension element displaceable along the fourth section. Still further, the third section may include a third guide track and the first extension element may include a third guide track follower while the fourth section may include a fourth guide track and the second extension element may include a fourth guide track follower.

Still further, the support may comprise a third link that is parallel to the first link and the second link. That third link may be fixed to the motor vehicle by at least one fastener.

In accordance with yet another aspect, a cup holder comprises a support, a first link and a second link. A first arm is connected by a first plurality of pivots to the first link, the second link and the support. In addition, a second arm is connected by a second plurality of pivots to the first link, the second link and the support. As a result of this structural arrangement, the cup holder is displaceable between a stowed position having a flat configuration and a deployed position having a cup cradle configuration.

In the following description, there are shown and described several preferred embodiments of the cup holder. As it should be realized, the cup holder is capable of other, different embodiments and its several details are capable of modification in various, obvious aspects all without departing from the cup holder as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cup holder and together with the description serve to explain certain principles thereof. In the drawing figures.

Reference will now be made in detail to the present preferred embodiments of the cup holder, examples of which are illustrated in the accompanying drawing figures.

DETAILED DESCRIPTION

Figure 6:
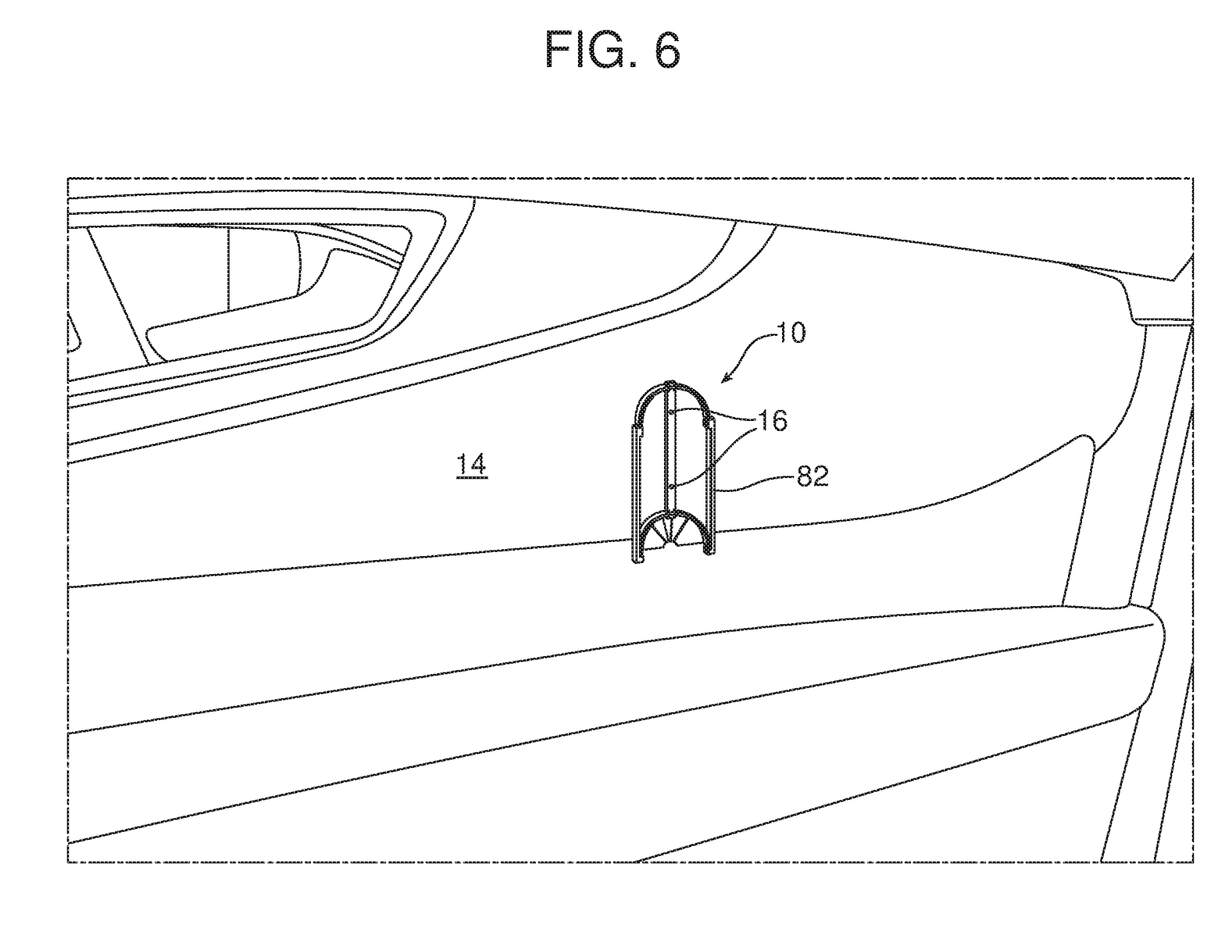
FIG. 6 is a schematic illustration of the cup holder showed in a stowed position within a relief or recess formed in a door trim panel so as to fit flush with that panel.

Reference is now made to FIGS. 1-6 illustrating the new and improved cup holder 10. As illustrated, the cup holder 10 includes a support 12 that may be fixed by means of multiple fasteners 16 to, for example, a trim panel 14 of a motor vehicle as illustrated in FIG. 6. The cup holder 10 also includes a first arm 18 connected by a first pivot 20 to the support 12. The cup holder 10 also includes a second arm 22 connected by a second pivot 24 to the support 12.

A first link 26 is connected by a third pivot 28 to the first arm 18 and by a fourth pivot 30 to the second arm 22. A second link 32 is connected by a fifth pivot 34 to the first arm 18 and by a sixth pivot 36 to the second arm 22. As illustrated in the drawing figures, the first link 26 is parallel to the second link 32. Further, in the illustrated embodiment the support 12 comprises a third link parallel to the first link 26 and second link 32.

As further illustrated in the drawing figures, the first arm 18 includes a first end 38 and a second end 40. The first pivot 20 is provided between the first end 38 and the second end 40. Similarly, the second arm 22 includes a third end 42 and a fourth end 44. The second pivot 24 is provided between the third end 42 and the fourth end 44.

As further illustrated in the drawing figures, the third pivot 28 is provided at the first end 38 of the first arm 18 and the fourth pivot 30 is provided at the third end 42 of the second arm 22. The fifth pivot 34 is provided at the second end 40 of the first arm 18 while the sixth pivot 36 is provided at the fourth end 44 of the second arm 22.

As further illustrated in the drawing figures, the first arm 18 and the second arm 22 are both curved.

Figure 3A:
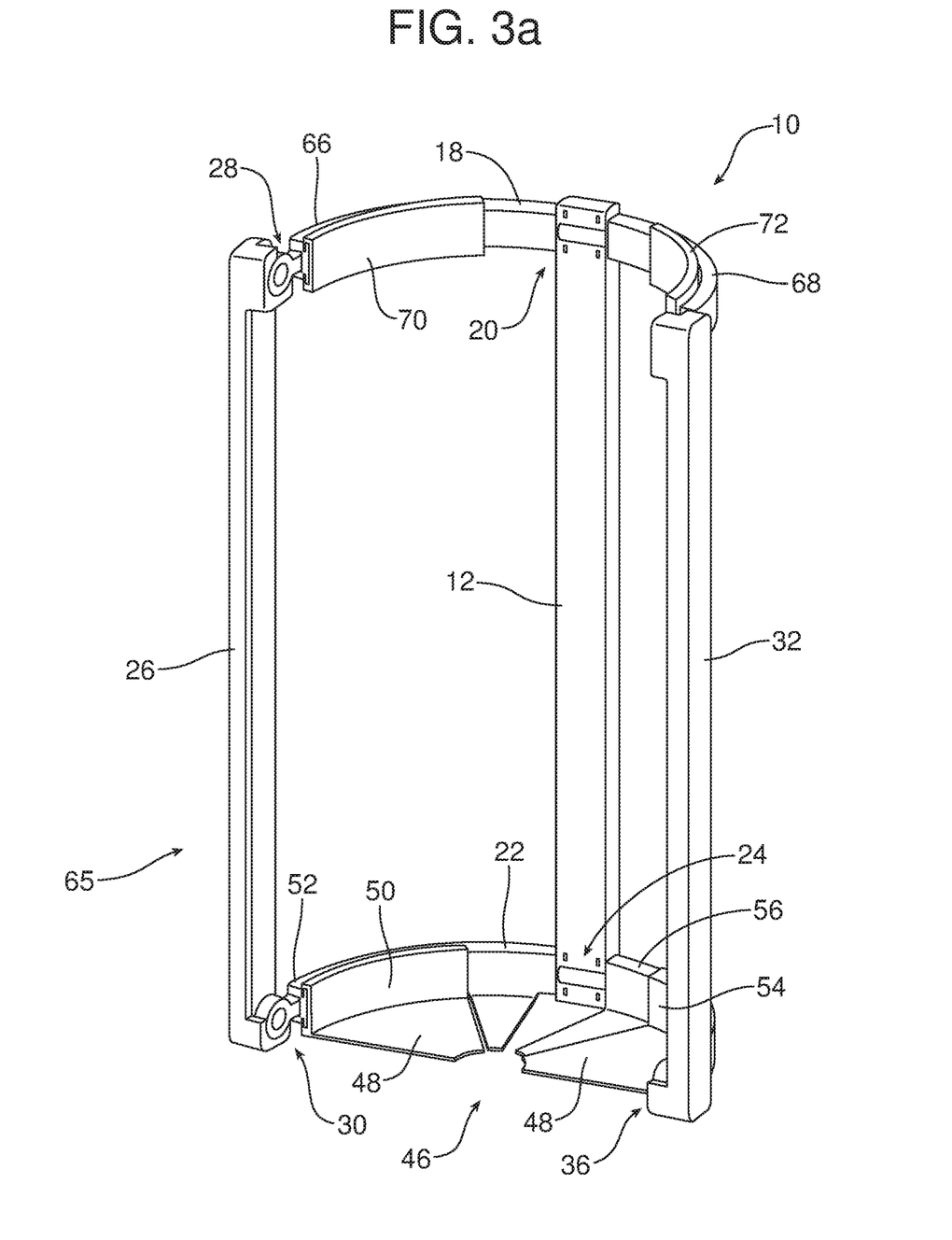
FIG. 3a is a perspective view of the cup holder in the fully deployed position wherein the second arm and cup support are substantially flat or horizontal and the cup holder has a cup cradle configuration.
Figure 3B:
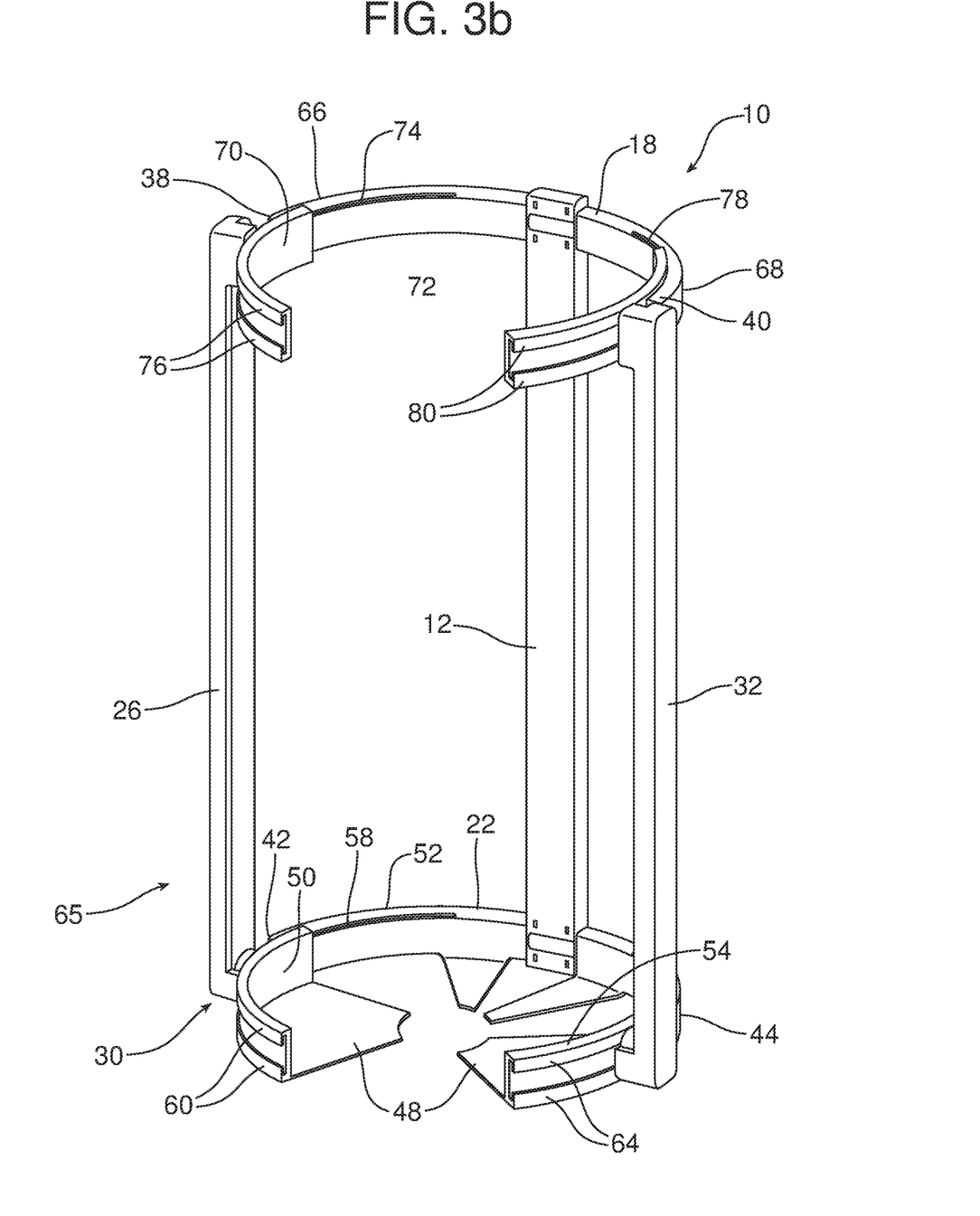
FIG. 3b is a view similar to FIG. 3a except the first and second slide elements and first and second extension elements have been deployed or extended to close the arc open of the cup cradle.
Figure 4A:
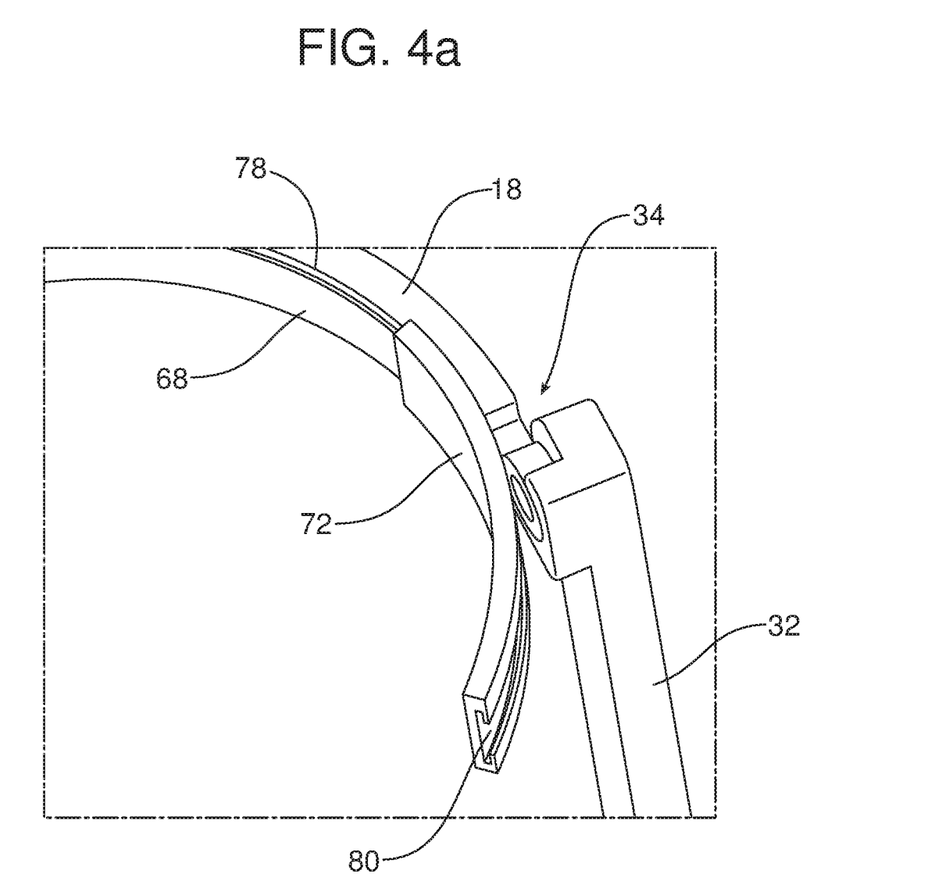
FIGS. 4a and 4b are respective detailed views of the second extension element and second slide element.
Figure 4B:
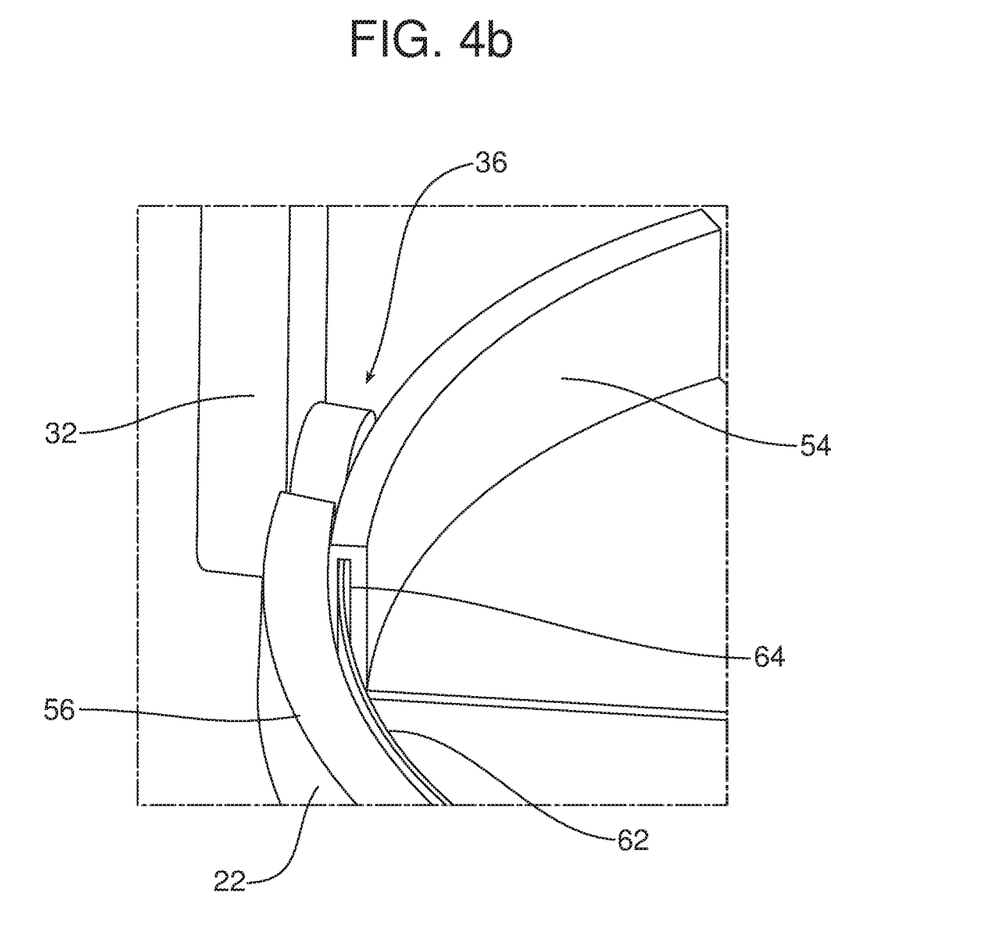
Figure 5A:
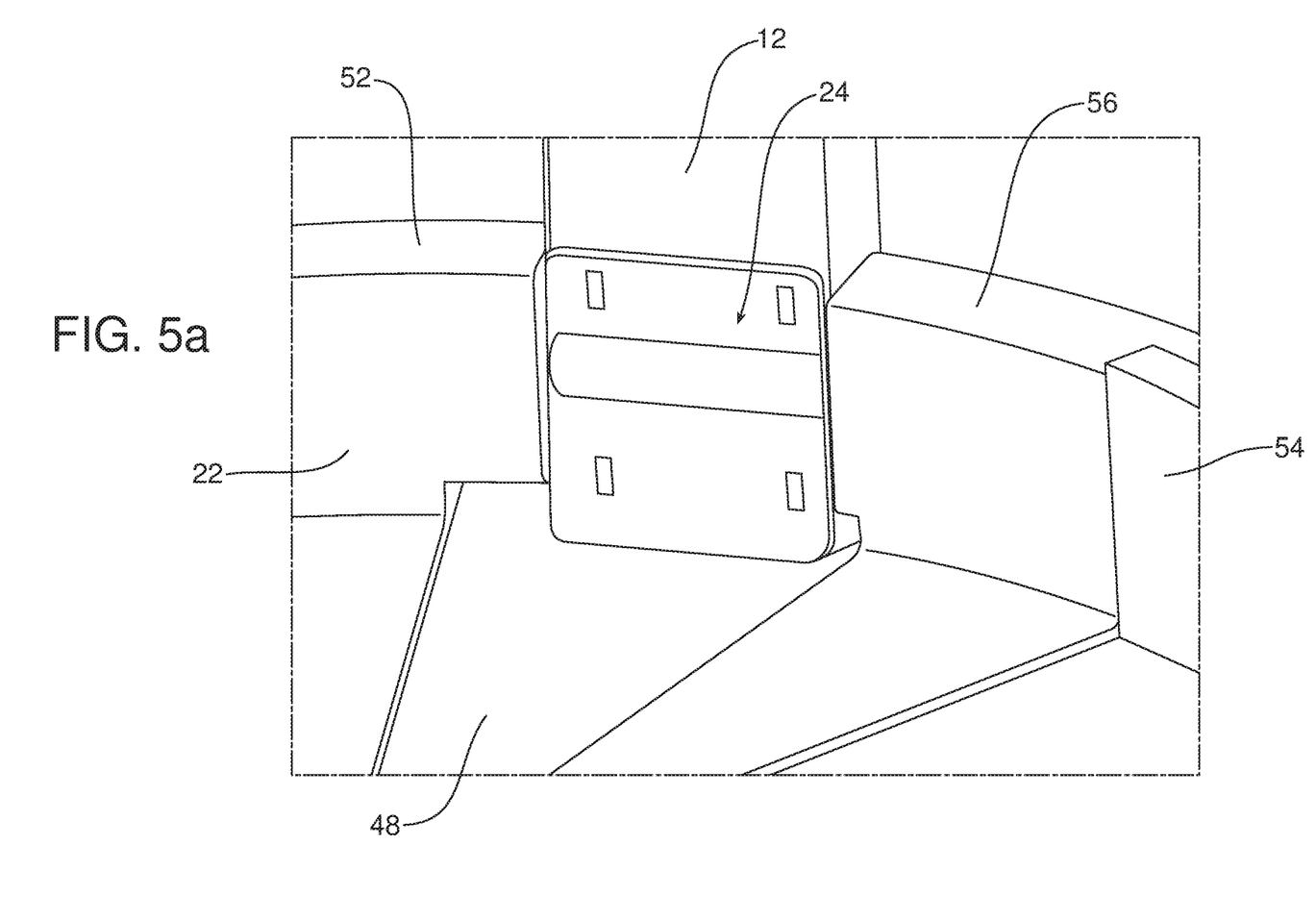
FIGS. 5a-5c are respective detailed views of the second pivot, third pivot and fourth pivot.
Figure 5B:
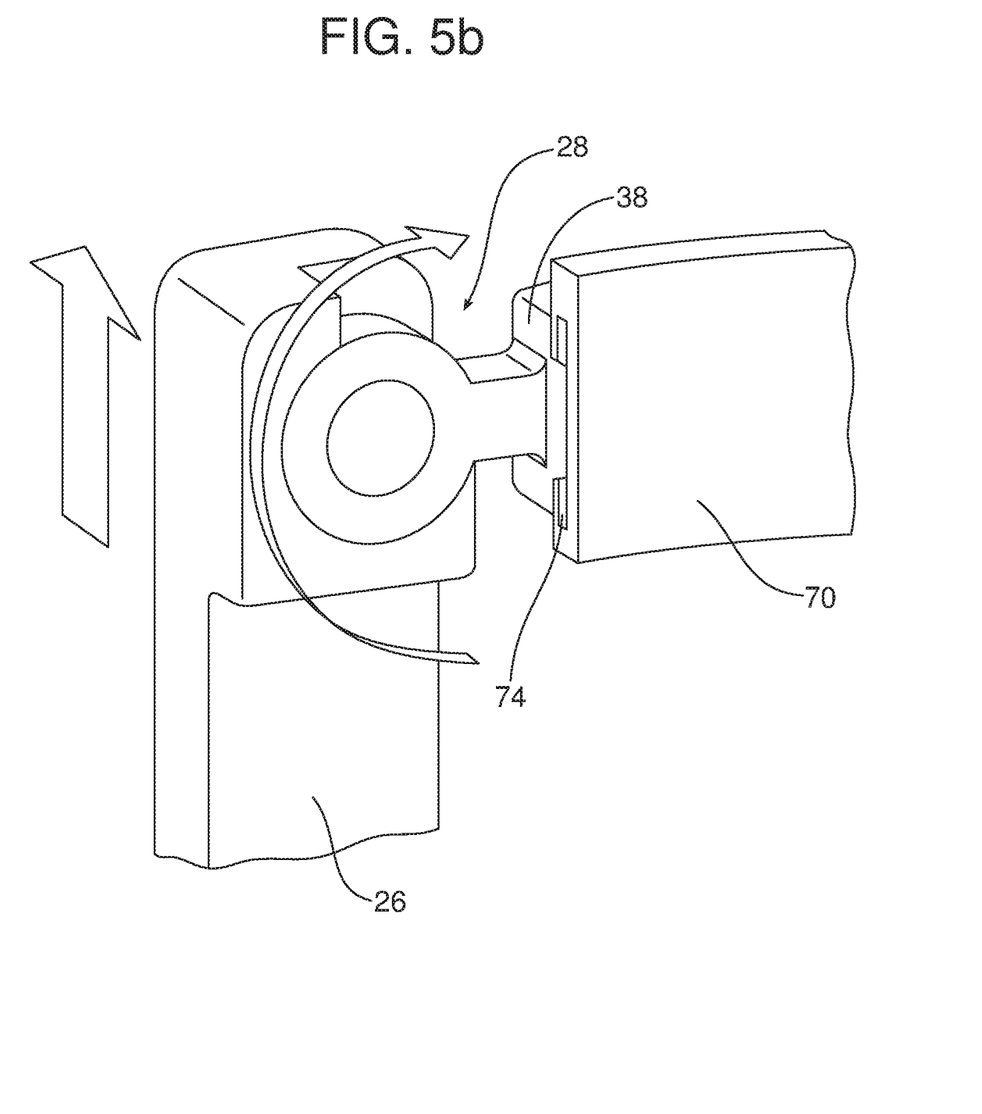
Figure 5C:
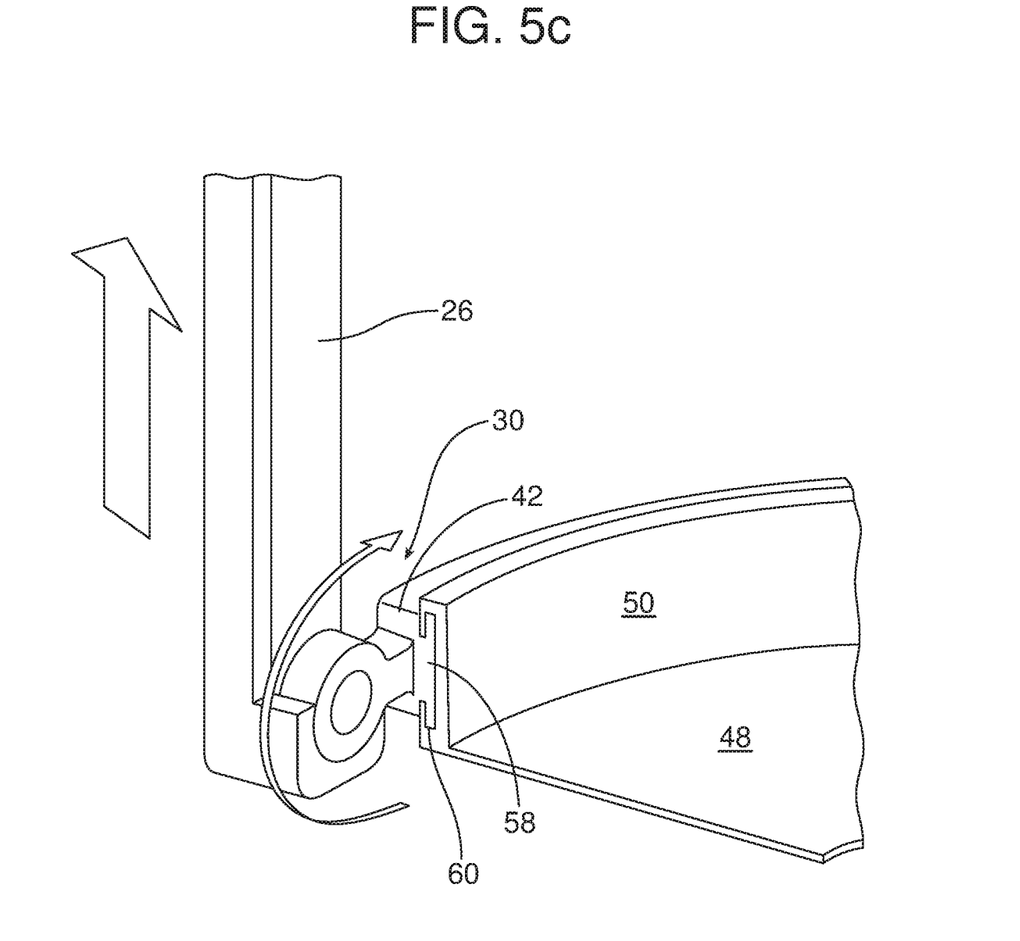

A cup support 46 depends from the second arm 22. The cup supports 46 comprises a plurality of triangular shaped flanges 48. As illustrated in FIGS. 3a and 3b, the cup support 46 includes a first slide element 50 displaceable along a first section 52 of the second arm 22 so as to extend beyond the fourth pivot 30. Similarly, the cup support 46 includes a second slide element 54 displaceable along a second section 56 of the second arm 22 so as to extend beyond the sixth pivot 36.

More specifically, the first section includes a first guide track 58 and the first slide element 50 includes a first guide track follower 60. Similarly, the second section 56 includes a second guide track 62 and the second slide element 54 includes a second guide track follower 64. The first guide track follower 60 slides in the first guide track 58 and the second guide track follower 64 slides in the second guide track 62 so as to allow the first slide element 50 and the second slide element 54 to be adjusted and selectively extended to close the open arc section of the cup cradle 65 extending between the third end 42 and fourth end 44 of the second arm 22 on the side of the cup holder opposite the support 12.

The first arm 18 includes a third section 66 and a fourth section 68. The first arm 18 also includes a first extension element 70 displaceable along the third section 66 and a second extension element 72 displaceable along the fourth section 68.

More specifically, the third section 66 includes a third guide track 74 and the first extension element 70 includes a third guide track follower 76. The fourth section 68 includes a fourth guide track 78 while the second extension element 72 includes a fourth guide track follower 80. This structure allows one to selectively extend the first extension element 70 and/or the second extension element 72 across the open part of the arc defined between the first end 38 and second end 40 of the first arm 18 opposite the support 12. By adjusting the length of the first slide element 50 and second slide element 54 as well as the length of the first extension element 70 and second extension element 72, the cup holder 10 may be adjusted to provide a cup cradle 65 to receive and hold different sizes of cups.

Figure 1:
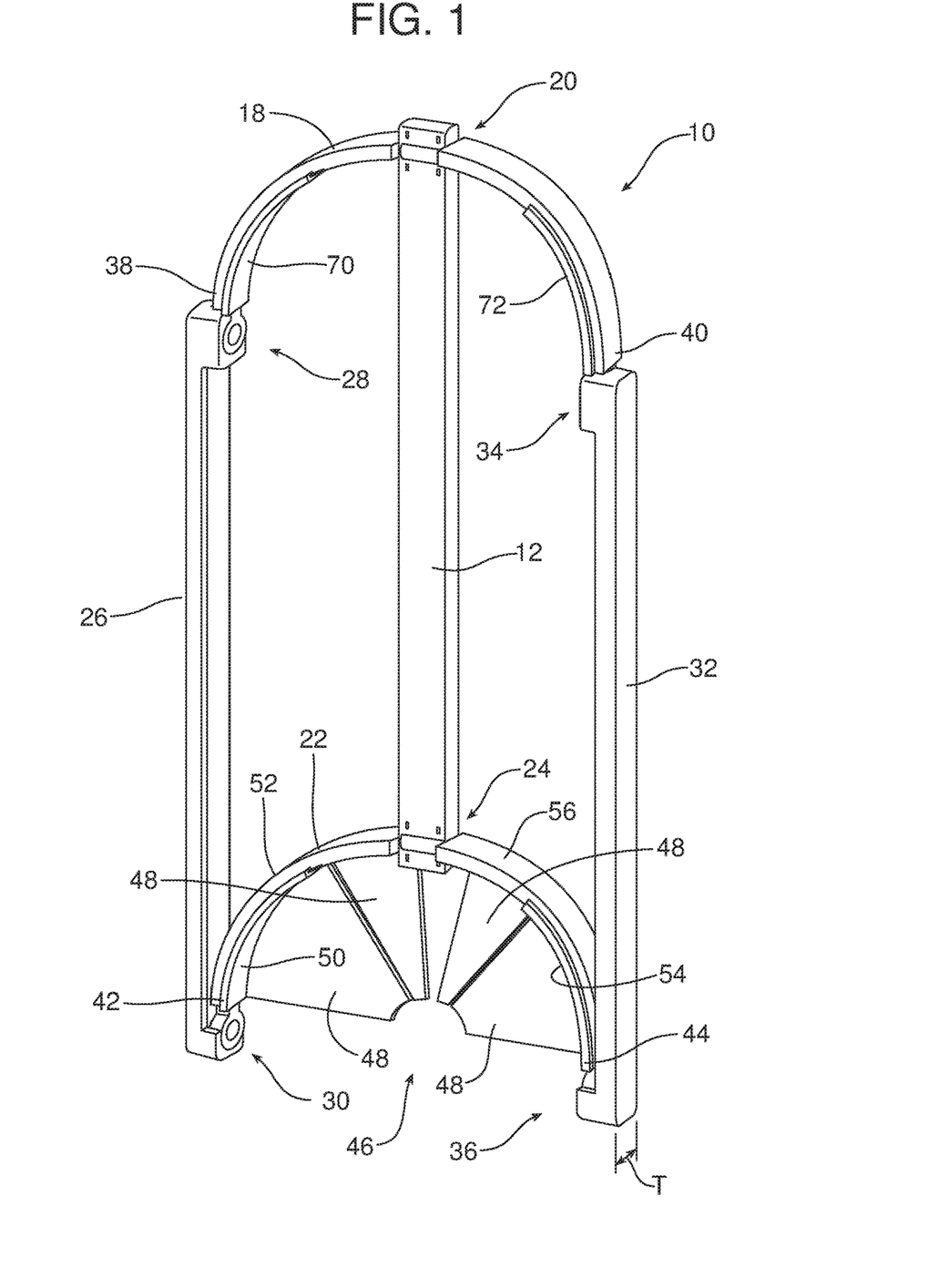
FIG. 1 is a perspective view of the cup holder in the fully stowed position having a flat configuration.
Figure 2:
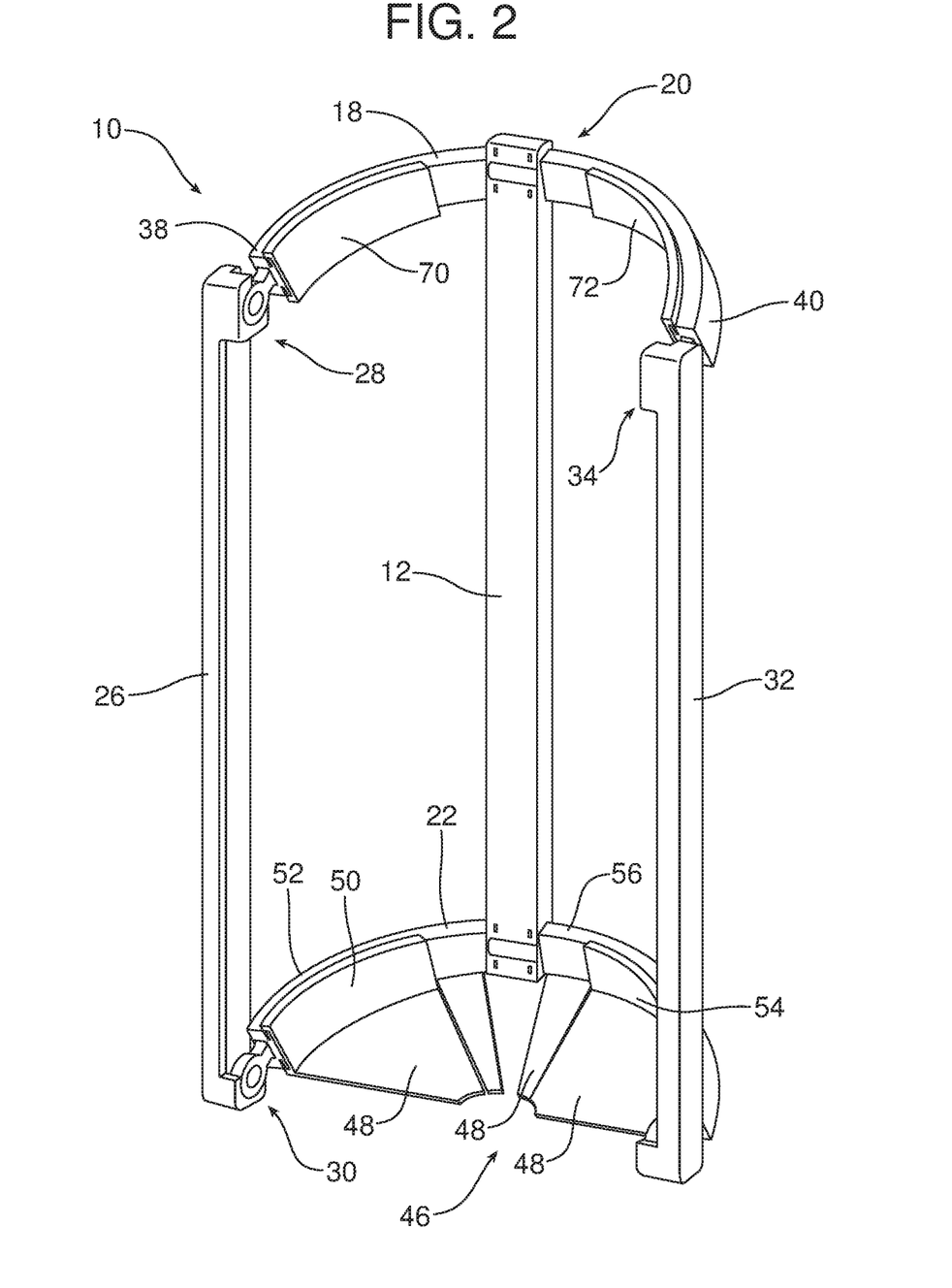
FIG. 2 is a perspective view of the cup holder in the partially deployed position.

As should be appreciated from reviewing FIGS. 1-3, the cup holder 10 is displaceable between a stowed position, having a flat configuration having a thickness T of the second link 32 as illustrated in FIG. 1, through a partially deployed or erected position as illustrated in FIG. 2 to a fully deployed position, having a cup cradle configuration, as illustrated in FIG. 3. Thus as should be appreciated, when the cup holder 10 is in the stowed position, it may be displaced to the deployed position by folding downward with the first arm 18 and second arm 22 being displaced from a substantially vertical position as illustrated in FIG. 1 to a substantially horizontal position as illustrated in FIG. 3. The geometry and weight of the cup holder 10 prevents it from folding past the fully deployed position illustrated in FIG. 3. As should be appreciated from reviewing FIGS. 3a and 3b, the first and second slide elements 50, 54 and the first and second extension elements 70, 72 may be adjusted or extended to close the open side of the arc formed by the first arm 18 and second arm 22 and thereby conform the cup cradle 65 to better hold a cup of a given size. After use, one simply displaces the cup holder 10 from the deployed position illustrated in FIG. 3 to the stowed position illustrated in FIG. 1 by folding the first arm 18 and second arm 22 upward. As illustrated in FIG. 6, when stowed so as to nest within the relief or recess 82 in the trim panel 14, the cup holder 10 is flush with the face of the trim panel so as to provide an embedded art look and an aesthetically pleasing effect.

The foregoing has been presented for purposes of illustration and description. It is not intended to be exhaustive or to limit the embodiments to the precise form disclosed. Obvious modifications and variations are possible in light of the above teachings. For example, the support 12 does not need to be in the form of a third link as illustrated but could simply be two short, disconnected mounting sections or plates, with one at each of the first and second pivots 20, 24. All such modifications and variations are within the scope of the appended claims when interpreted in accordance with the breadth to which they are fairly, legally and equitably entitled.

What is claimed:

1. A cup holder, comprising:
   a fixed support;
   a first arm connected by a first pivot to said support, said first arm including a first end and a second end and said first pivot is between said first end and said second end;
   a second arm connected by a second pivot to said support, said second arm including a third end and a fourth end and said second pivot is between said third end and said fourth end;
   a first link connected by a third pivot to said first arm and by a fourth pivot to said second arm;
   a second link parallel to said first link, said second link being connected by a fifth pivot to said first arm and a sixth pivot to said second arm; and
   a cup support depending from said second arm, said cup support including (a) a first slide element displaceable along a first section of said second arm so as to extend beyond said fourth pivot and (b) a second slide element displaceable along a second section of said second arm so as to extend beyond said sixth pivot;

wherein said third pivot is adjacent said first end, said fourth pivot is adjacent said third end, said fifth pivot is adjacent said second end, said sixth pivot is adjacent said fourth end, said first arm is curved, said second arm is curved, said first section includes a first guide track, said first slide element includes a first guide track follower, said second section includes a second guide track, said second slide element includes a second guide track follower, said first arm includes a third section and a fourth section, and said first arm includes a first extension element displaceable along said third section and a second extension element displaceable along said fourth section.

2. The cup holder of claim 1, wherein (a) said third section includes a third guide track and said first extension element includes a third guide track follower and (b) said fourth section includes a fourth guide track and said second extension element includes a fourth guide track follower.

3. The cup holder of claim 2, wherein said support comprises a third link parallel to said first link and said second link.

4. The cup holder of claim 3, wherein said third link is fixed to a motor vehicle by at least one fastener.

5. The cup holder of claim 4, wherein said support comprises a third link parallel to said first link and said second link.

6. The cup holder of claim 5, wherein said third link is fixed to the motor vehicle by at least one fastener.

\* \* \* \* \*